US 6,540,135 B1

United States Patent
Berstis

(10) Patent No.: US 6,540,135 B1
(45) Date of Patent: Apr. 1, 2003

(54) METHOD AND SYSTEM FOR EXPEDITING SERVICE TO A USER BY DEFAULTING TO TYPICAL PREFERENCES OF THE USER AT A SERVICE-ORIENTED USER INTERFACE TERMINAL

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,439

(22) Filed: Dec. 17, 1999

(51) Int. Cl.⁷ ............................................... G06F 17/60
(52) U.S. Cl. ....................................... 235/379; 235/380
(58) Field of Search .................................. 235/379, 380

(56) References Cited

U.S. PATENT DOCUMENTS

| 5,311,594 | A |   | 5/1994 | Penzias |
| 5,345,549 | A |   | 9/1994 | Appel et al. |
| 5,602,745 | A | * | 2/1997 | Atchley et al. ............ 235/94 X |
| 5,774,525 | A |   | 6/1998 | Kanevsky et al. |
| 5,923,735 | A | * | 7/1999 | Swartz et al. ........... 235/472.01 |
| 5,960,411 | A | * | 9/1999 | Hartman ...................... 705/26 |
| 6,119,933 | A | * | 9/2000 | Wong et al. ................ 235/380 |
| 6,246,996 | B1 | * | 6/2001 | Stein et al. ................... 705/26 |
| 6,283,366 | B1 | * | 9/2001 | Hills et al. .................. 235/379 |
| 6,315,195 | B1 | * | 11/2001 | Ramachandran ............ 235/380 |
| 6,336,590 | B1 | * | 1/2002 | Kubitz ........................ 235/375 |

FOREIGN PATENT DOCUMENTS

JP        404355895       * 12/1992

\* cited by examiner

Primary Examiner—Karl D. Frech
Assistant Examiner—Allyson Sanders
(74) Attorney, Agent, or Firm—Leslie A. Van Leeuwen; Bracewell & Patterson, L.L.P.

(57) ABSTRACT

A system and method for expediting service to a user by automatically defaulting to the typical preferences of the user for a remote point of purchase action at a facility which permits such actions is described. In one version, the user utilizes a credit or debit card to make a purchase at the facility. After the card is authorized, the user's profile of his or her routine selections at such facilities is retrieved. After the user's profile is obtained, the user is allowed to immediately complete the transaction rather than proceed through the option selection process. The system utilizes the user profile to automatically default the prompts and inquiries of the interface terminal to the typical selections chosen by the user. This feature expedites service to users by allowing them to bypass the interactive option selection process with the terminal. The user may deviate from his or her typical selections by entering alternate selections in a conventional manner at any time.

25 Claims, 3 Drawing Sheets

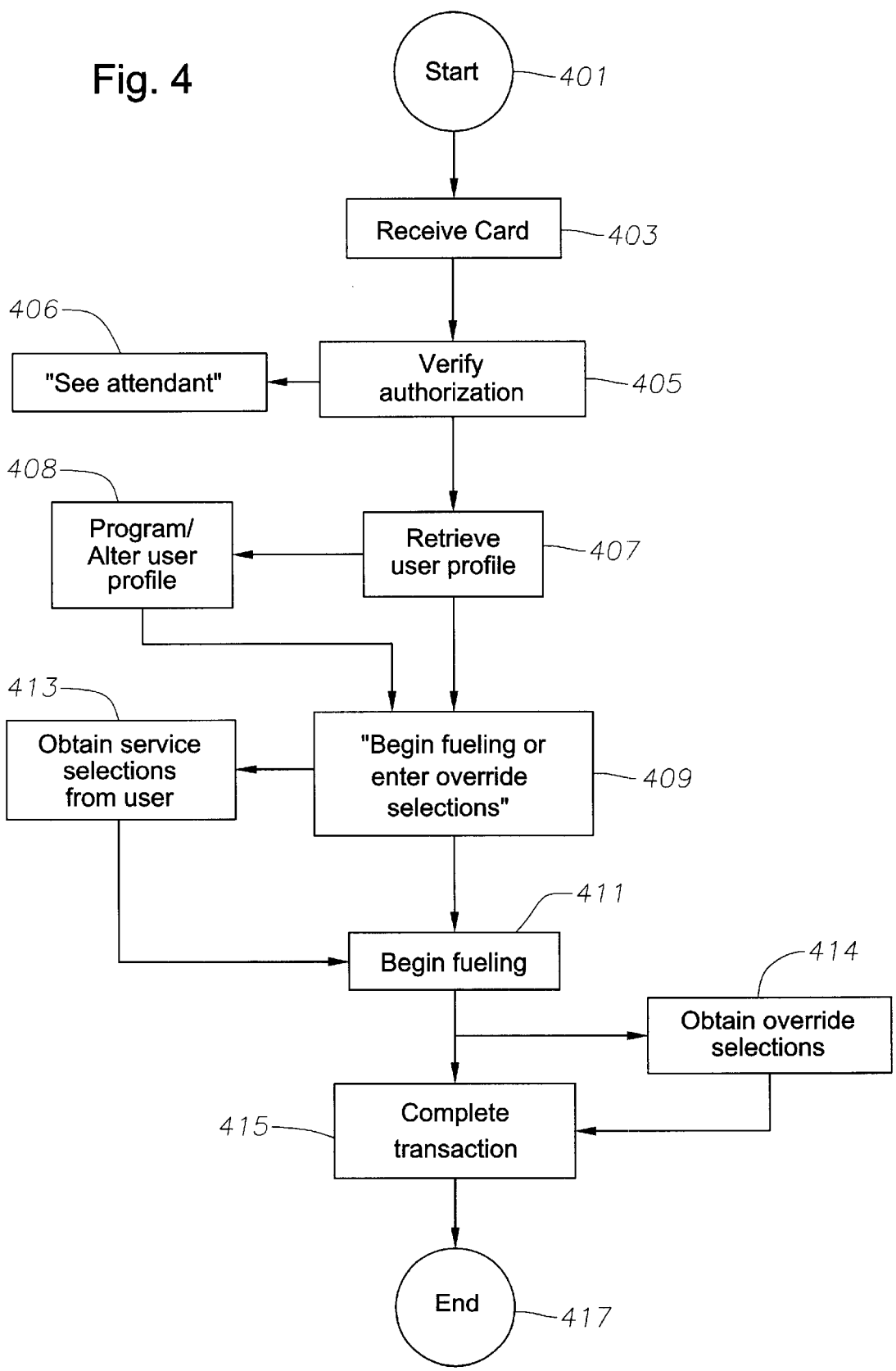

METHOD AND SYSTEM FOR EXPEDITING SERVICE TO A USER BY DEFAULTING TO TYPICAL PREFERENCES OF THE USER AT A SERVICE-ORIENTED USER INTERFACE TERMINAL

BACKGROUND OF THE INVENTION

1. Technical Field

This invention relates in general to an improved method and system for interfacing with customers at service-oriented terminals, and in particular to a method and system for enhancing the efficiency of service-oriented, user interface terminals where users make purchases electronically. Even more particularly, the invention relates to a system and method for expediting service to a user by automatically defaulting to the typical preferences of the user for a remote point of purchase action at a facility which permits such actions.

2. Description of the Related Art

Service-oriented, user interface terminals for making purchases electronically, such as with a commercial credit card or debit card, are now common. These types of terminals are typically utilized wherever a basic or routine transaction can be processed more efficiently on site without the need for human intervention or judgment. Examples include fuel pumps of automotive refueling stations, automated vending machines for purchasing tickets for transportation (e.g., airline tickets), personalized greeting card vending machines, and the like. Users of such terminals tend to become repeat customers and, in many instances, select the same set of options every time they make a transaction. For example, whenever an individual uses his or her credit card to purchase automotive fuel directly at the fuel pump, he or she may always choose the premium grade of fuel, never want a receipt, and always select the lowest priced car wash.

To use these terminals, users are merely required to swipe their electronic card through a reading device (thereby entering their account information into the system) and wait for approval by the system before selecting their options. Once approval has been obtained, users typically make their selections one by one as prompted by the terminal. Although the process of utilizing interface terminals is more efficient than interacting with human service providers, the process is capable of becoming even more streamlined for users who tend to make the same selections during each transaction. Thus, an improved algorithm with an enhanced selection process for interfacing users of service-oriented terminals is needed. The algorithm also should have an override feature for the users when they choose to deviate from their typical selections.

SUMMARY OF THE INVENTION

A system and method for expediting service to a user by automatically defaulting to the typical preferences of the user for a remote point of purchase action at a facility which permits such actions is described. In one version, the user utilizes a credit or debit card to make a purchase at the facility. After the card is authorized, the user's profile of his or her routine selections at such facilities is retrieved. After the user's profile is obtained, the user is allowed to immediately complete the transaction rather than proceed through the option selection process. The system utilizes the user profile to automatically default the prompts and inquiries of the interface terminal to the typical selections chosen by the user. This feature expedites service to users by allowing them to bypass the interactive option selection process with the terminal. The user may deviate from his or her typical selections by entering alternate selections in a conventional manner at any time.

Accordingly, it is an object of the present invention is to provide an improved method and system for interfacing with customers at service-oriented terminals.

It is an additional object of the present invention is to provide a method and system for enhancing the efficiency of service-oriented, user interface terminals where users make purchases electronically.

Yet another object of the present invention is to provide a system and method for expediting service to a user by automatically defaulting to the typical preferences of the user for a remote point of purchase action at a facility which permits such actions.

Additional objects and advantages of the invention will become apparent in light of the description which follows.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 4 is a high level, logic flowchart of an illustrative embodiment of the method and system of the present invention utilized by the automated refueling station of FIG. 1.

DETAILED DESCRIPTION OF THE PREFERRED EMBODIMENT

The present invention may be executed in a variety of systems including computer systems having various operating systems. The computer system may be a personal computer, a network computer, a midrange computer or a mainframe computer. In addition, the computer may be a stand-alone system or part of a network such as a local-area network (LAN) or a wide-area network (WAN). For the purposes of illustration, one embodiment of the present invention, as described below, is implemented utilizing a personal computer.

Figure 1:
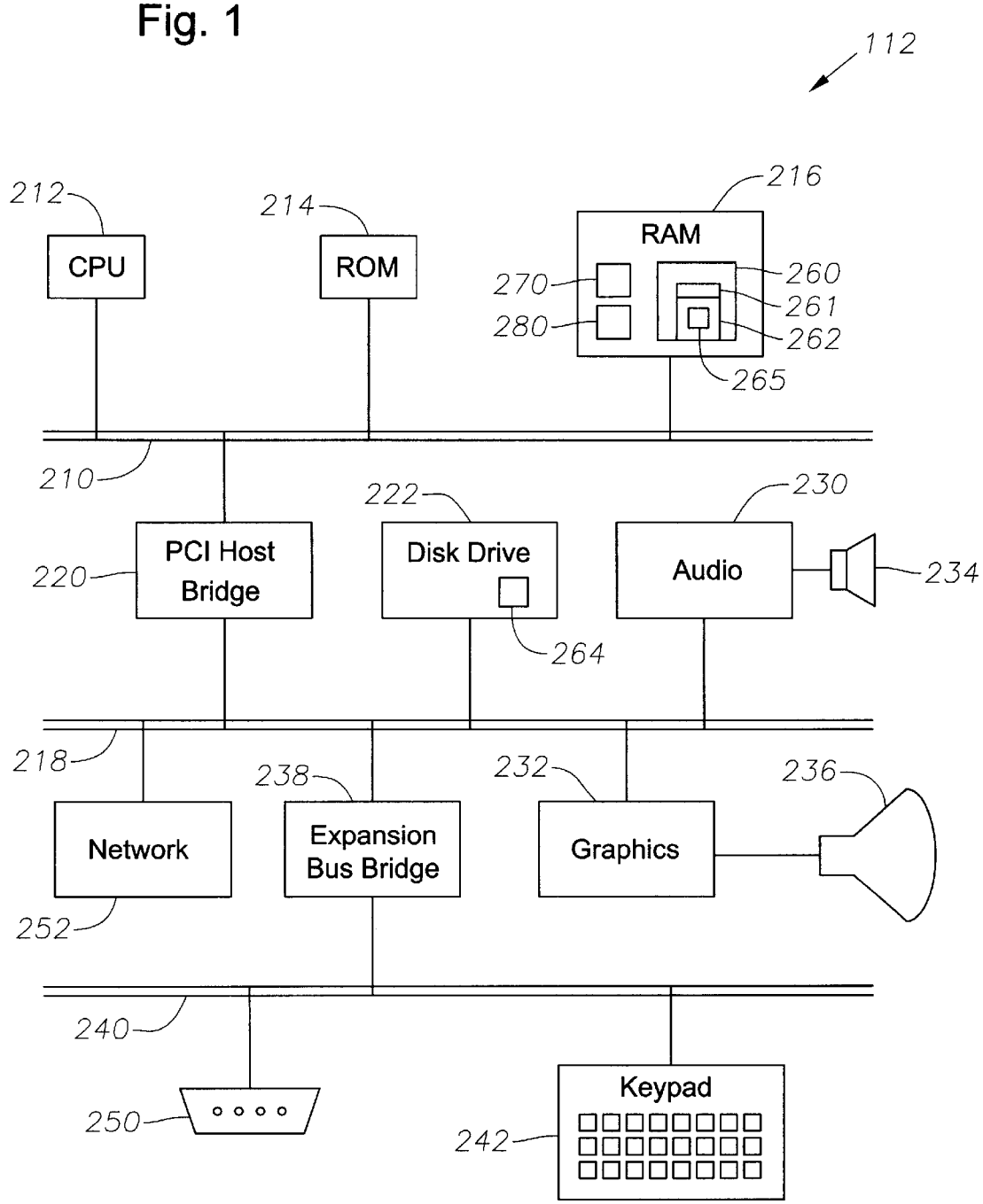
FIG. 1 depicts a schematic diagram of an illustrative embodiment of an automated refueling station interface terminal constructed in accordance with the method and system of the present invention.

Referring now to FIG. 1, there is depicted a block diagram of a server 112. Server 112 includes a system bus 210 that is connected to a central processing unit (CPU) 212 and to memory, including read only memory (ROM) 214 and random access memory (RAM) 216. System bus 210 is coupled to a PCI local bus 218 through a PCI host bridge 220. PCI local bus 218 is connected to additional nonvolatile data storage devices, such as one or more disk drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keypad 242 for receiving operator input.

Also included within server 112 are data ports for communicating with external equipment, such as other data processing systems. The data ports include, without limitation, a serial port 250 attached to ISA bus 240 for linking server 112 to remote data processing systems (such as a bridge) via a modem (not illustrated) and a communications adapter 252 attached to PCI bus 218 for linking server 112 to other stations of a LAN (such as clients).

Server 112 also contains software applications that are stored on the data storage devices and loaded into RAM 216 for execution by CPU 212. Among those applications is a communications program, such as communications manager 260, that manages the exchange of information between the LAN and remote data processing systems. Included in communications manager 260 is a connection initiator 261 for establishing dial-up connections to remote data processing systems. Communications manager 260 also includes Internet sharing software 262 that enables multiple LAN stations to access the Internet via a single connection. In the illustrative embodiment, server 112 also includes a connection schedule file 264, which preferably is stored in disk drive 222, and Internet sharing software 262 includes a request predictor 265 that utilizes connection schedule file 264 to trigger connection initiator 261 in advance of anticipated communication requests.

Connection schedule file 264 is maintained by a schedule editor and/or an automatic schedule modifier, each of which is preferably also included in Internet sharing software 262. Server 112 also includes a Web browser 270 and an E-mail client 280 that allow an operator of server 112 or client to retrieve and view information from the Internet and send and receive E-mail via the Internet, respectively.

Figure 2:
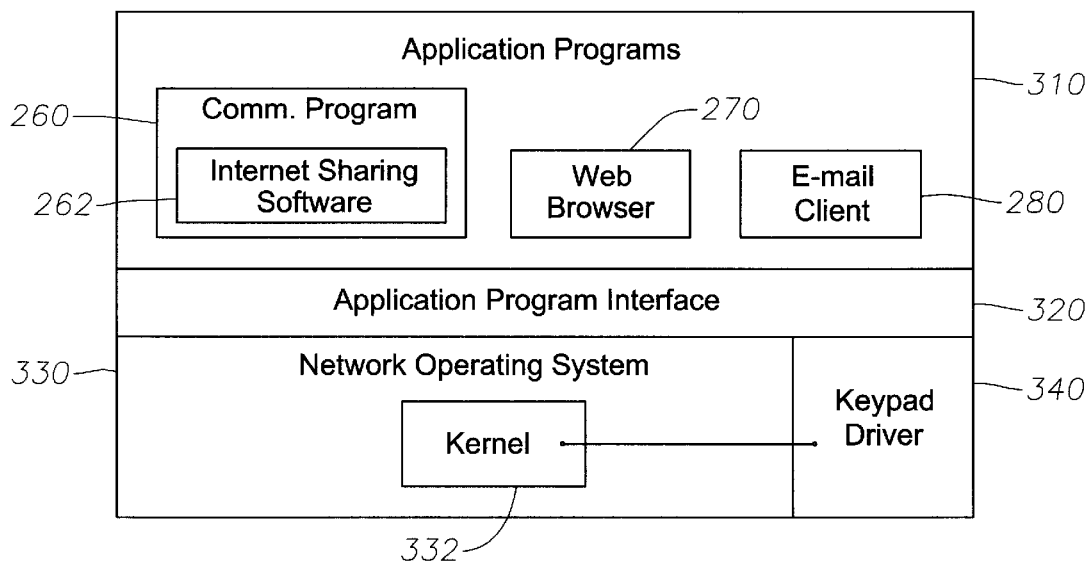
FIG. 2 is a layer diagram of the programs in the data processing system of FIG. 1 that cooperate to automatically connect to a remote data processing system according to the method and system of the present invention.

With reference now to FIG. 2, there is depicted a layer diagram of the software applications within server 112 that cooperate to provide the functionality of the present invention according to the illustrative embodiment. At the highest level of the layer diagram are the software application programs 310, including communications manager 260, web browser 270, and E-mail client 280. At the intermediate level is an application program interface (API) 320, through which application programs 310 request services from the operating system 330. Operating system 330, which occupies the lowest level of the layer diagram, is a network operating system. As such, in addition to managing the operations of server 112 (by performing duties such as resource allocation, task management, and error detection), operating system 330 also provides tools for managing communications within the LAN and between LAN stations and remote data processing systems. Included within operating system 330 is a kernel 332 that manages the memory, files, and peripheral devices of server 112. The lowest level also includes device drivers, such as a keypad driver 340 that kernel 332 utilizes to manage input from and output to peripheral devices.

For purposes of illustration of the invention, an automotive refueling station having a fuel pump equipped with a user interface terminal 81 (FIG. 3) is described. Terminal 81 includes a display screen 83 and option buttons 85 that can be selected by the user when prompted by the system.

Referring now to FIG. 4, there is illustrated one embodiment of a high level, logic flow diagram of a method for automatically defaulting to typical user preferences for a remote point of purchase action at a facility with interface terminals which permits such actions. Note that the present invention is capable of tracking the selections of users across multiple interface terminals while they are using cards with different account numbers. Alternatively, the invention is also adapted to track the selections of a user at individual interface terminals with a single card, or any combination of these scenarios.

Figure 3:
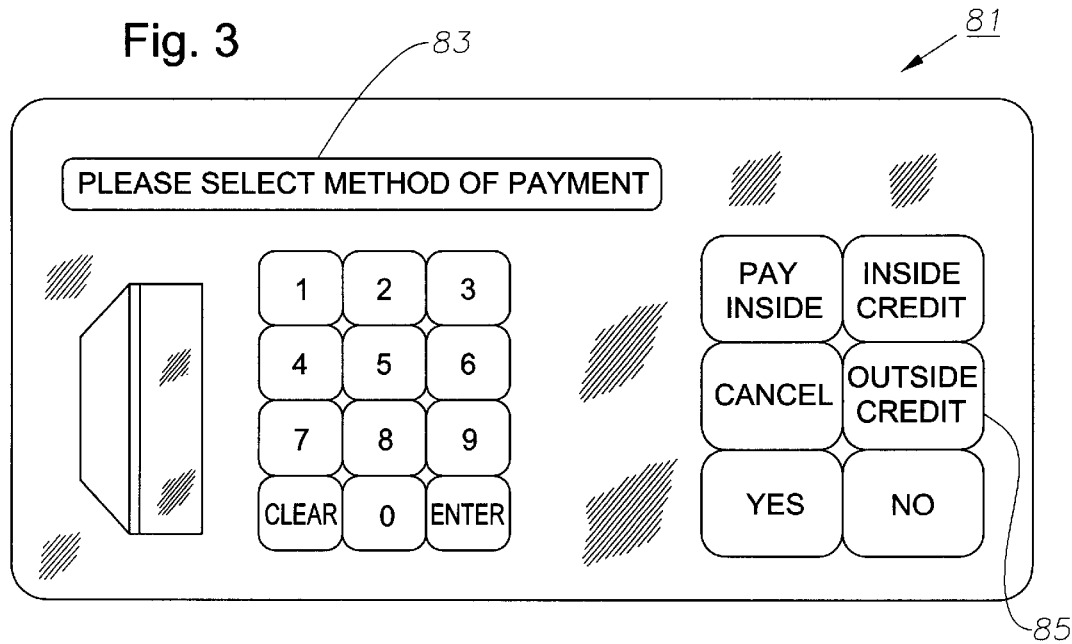
FIG. 3 is a schematic diagram of an optional user interface terminal for the data processing system of FIG. 1.

In one embodiment, a fuel pump is equipped with the terminal 81 of FIG. 3, and the algorithm begins as illustrated at block 401 (FIG. 4). A payment card 87 with an optional memory 89 (FIG. 3) is used to purchase fuel at a fuel pump. Payment card 87 may comprise a credit card or a debit card and is scanned or read at terminal 81, as shown in block 403. The payment card may be any electronically, magnetically, optically, or otherwise scanned device. As depicted in block 405, a determination is then made as to whether or not a line of credit or debit is authorized by the card issuer. If the card is not authorized, the process proceeds to block 406. Block 406 illustrates displaying within display screen 83 "See attendant," "Authorization denied," or a similar message for conveying to the user that an alternate means of payment is required.

If the card is authorized, the process proceeds to block 407. Block 407 depicts the retrieval of a user profile (UP) for the authorized user of the card. The user profile may be stored in memory 89 of card 87, on site at the pump, terminal, or server, or at a remote data base. The user profile represents the routine or typical selections that the user chooses when given the same choice of options at each transaction. For example, when the user utilizes his or her card at the fuel pump of a refueling station, the user is always prompted by the following inquiries: (a) "Would you like a receipt for this purchase?"; (b) "Select fuel grade."; (c) "Would you like a car wash?", and, if so, (d) "Select type of car wash." Since some users tend to select the same set of options at every visit, a user profile of the typical selections for each user can be generated. For example, in the last n visits (e.g., five visits), the user has never requested a receipt, always selected premium unleaded fuel, and always purchased an economy car wash. This hypothetical user's purchase habits readily generate a user profile that can be used to expedite service to the user each time the card(s) is utilized. As depicted at block 408, users are allowed to manually program or alter their user profile after authorization rather than allowing the system to interpret and select the default settings.

After the user's profile is obtained (block 407) and displayed for review on display screen 83, the process proceeds to block 409 wherein the user is allowed to begin fueling immediately without having to select any options. As illustrated in block 411, the system utilizes the user profile to automatically default the prompts and inquiries of the interface terminal to the typical selections chosen by the user, thereby allowing the user to begin fueling his or her vehicle immediately. The system makes selections that are consistent with the user profile so that the user does not have to the make selections at each visit. This feature expedites service to users by allowing them to bypass the interactive option selection process with the terminal. In this example, the fuel grade, issuance of a receipt, and purchase of a car wash are automatically selected without user intervention.

However, as depicted in block 413, the user may occasionally desire to deviate from his or her typical selections.

In such circumstances, the user simply overrides the default user profile by entering his or her selections in a conventional manner. The user would not begin fueling immediately upon authorization until at least one new selection is made (e.g., the fuel grade selection). As illustrated in block 414, the user also has the option of entering any other desired override selections during or after the fueling process. Block 415 illustrates a determination of whether a "fueling complete" signal has been received by the process from the user. When the user has completed the refueling of his or her vehicle, the fueling complete signal is received by the system which then completes the transaction as instructed by the user profile or the override selections, if any (e.g., printing of the receipt and car wash code, etc.). Afterward, the process exits as illustrated at block 417.

The present invention has several advantages. This method and system described herein is an improved service interface for customers of service-oriented terminals. The present invention enhances the efficiency of service-oriented, user interface terminals where users make purchases electronically. This system and method expedites service to users by automatically defaulting to the typical preferences of the users for remote point of purchase actions at facilities which permit such actions.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

What is claimed is:

1. A method for expediting service during a remote point of purchase action at a facility which permits such actions, said method comprising the steps of:
   storing selections made by a user in response to prompts for the purchase of goods or services while the user was utilizing a payment card during a previous transaction, and generating a user profile in response thereto;
   receiving the payment card during a current transaction at the facility;
   authorizing the payment card;
   retrieving the user profile;
   automatically defaulting the prompts for the purchase of goods or services of the current transaction to the selections defined in the user profile without requiring the user to respond to the prompts for the purchase of goods or services; and
   completing the current transaction with no additional input from the user.

2. The method of claim 1, further comprising a step of allowing the user to manually override the selections of the current transaction.

3. The method of claim 1, further comprising a step of allowing the user to manually program the user profile.

4. The method of claim 1 wherein the step of storing selections comprises storing selections made by the user at a plurality of facilities.

5. The method of claim 1 wherein the step of storing selections comprises storing selections made by the user while using a credit or debit card.

6. The method of claim 1 wherein the step of storing selections comprises storing selections made by the user while using a plurality of credit or debit cards, wherein each of the credit or debit cards has a different account number.

7. The method of claim 1 wherein the step of storing selections comprises storing the selections on the payment card.

8. The method of claim 1 wherein the step of storing selections comprises storing the selections at the facility.

9. The method of claim 1 wherein the step of storing selections comprises storing the selections at a remote data base.

10. A system for expediting a remote point of purchase action at a facility which permits such actions, comprising:
    a memory for storing previous selections for the purchase of goods or services made by a user to geneate a user profile;
    a user terminal adapted to prompt a user with options for the purchase of goods or services during a transaction at the facility;
    processor means for retrieving the user profile during a current transaction at the user terminal;
    control means for automatically selecting options for the purchase of goods or services that are consistent with the user profile during the current transaction such that the user does not have to make any selections for the purchase of goods or services in order to expedite and complete the current transaction with no additional input from the user.

11. The system of claim 10 wherein the user terminal is a device for reading a payment card.

12. The system of claim 10 wherein the user terminal allows the user to manually override the options selected during the current transaction.

13. The system of claim 10 wherein the user terminal allows the user to manually program the user profile.

14. The system of claim 11 wherein the memory is located on the payment card.

15. The system of claim 11 wherein the memory is located in the facility.

16. The system of claim 11 wherein the memory is located in a remote data base.

17. A computer program product, residing on a computer usable medium and having computer usable program means embodied therein, said computer usable program means comprising:
    means for storing selections made by a user in response to prompts for the purchase of goods or services while the user was utilizing a payment card during a previous transaction, and generating a user profile in response thereto;
    means for receiving the payment card during a current transaction at the facility;
    means for authorizing the payment card;
    means for retrieving the user profile;
    means for automatically defaulting the prompts for the purchase of goods or services of the current transaction to the selections defined in the user profile without requiring the user to respond to the prompts for the purchase of goods or services; and
    means for completing the current transaction with no additional input from the user.

18. The computer program product of claim 17, further comprising means for allowing the user to manually override the selections of the current transaction.

19. The computer program product of claim 17, further comprising means for allowing the user to manually program the user profile.

20. The computer program product of claim 17 wherein the means for storing selections stores selections made by the user at a plurality of facilities.

21. The computer program product of claim 17 wherein the means for storing selections stores selections made by the user while using a credit or debit card.

22. The computer program product of claim 17 wherein the means for storing selections stores selections made by the user while using a plurality of credit or debit cards, wherein each of the credit or debit cards has a different account number.

23. The computer program product of claim 17 wherein the means for storing selections stores the selections on the payment card.

24. The computer program product of claim 17 wherein the means for storing selections stores the selections at the facility.

25. The computer program product of claim 17 wherein the means for storing selections stores the selections at a remote data base.

* * * * *